April 26, 1938.        R. L. UHL        2,115,598
TEMPERATURE CONTROL DEVICE
Filed Aug. 6, 1935        2 Sheets-Sheet 2
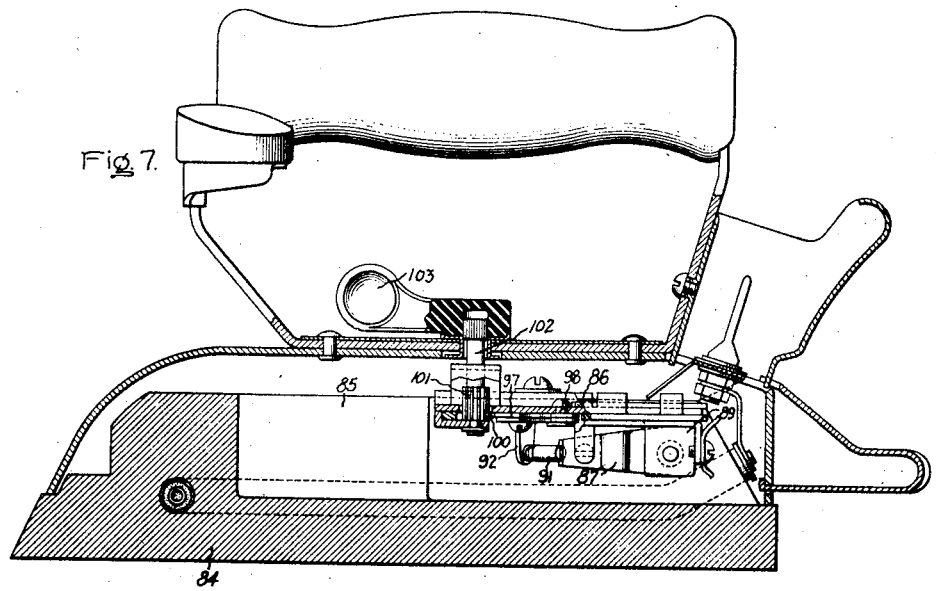
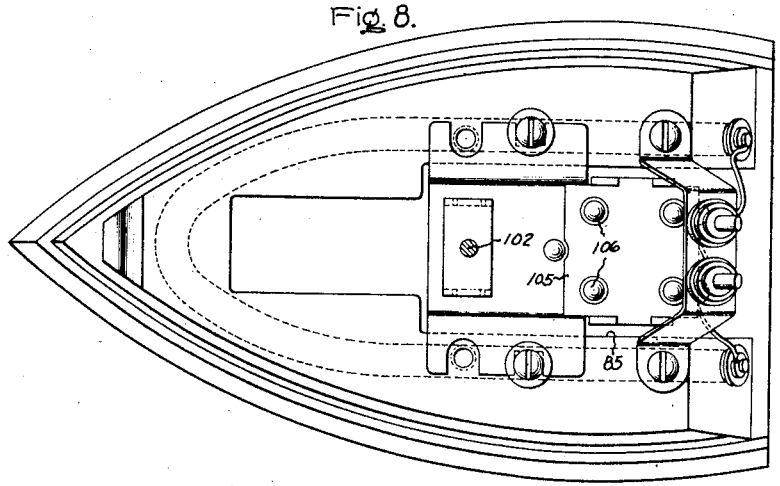
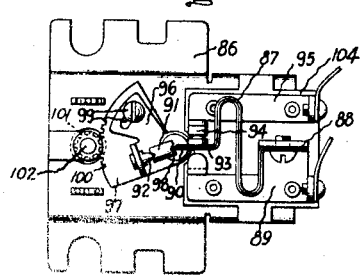
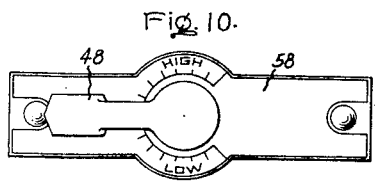
Inventor:
Robert L. Uhl,
by Harry E. Dunham
His Attorney Patented Apr. 26, 1938

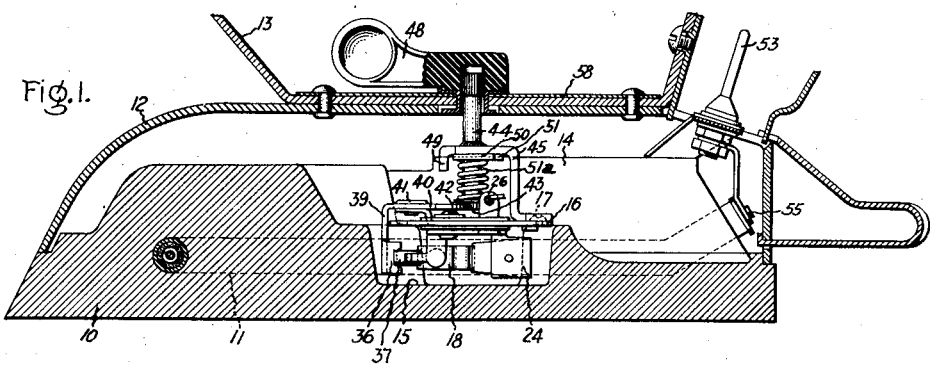

2,115,598

UNITED STATES PATENT OFFICE 2,115,598

TEMPERATURE CONTROL DEVICE

Robert L. Uhl, Ontario, Calif., assignor to General Electric Company, a corporation of New York Application August 6, 1935, Serial No. 34,909

9 Claims. (Cl. 200—138)

This invention relates to temperature control devices, more particularly to devices for controlling an electric circuit in accordance with temperature changes, and it has for its object the provision of an improved device of this character which is simple and inexpensive to make and which is reliable and efficient in its operation.

This invention contemplates the provision of an improved temperature control device wherein the temperature responsive element is arranged both to act as the motive means for operating the switch, or other control member, and also as the means for causing the control member to be moved with a snap action.

In accordance with this invention, in one form thereof a bimetallic thermostat is provided. One end of the thermostat is fixed, while its other end is free to move in response to temperature changes. Between these fixed and free ends, there is provided a resilient portion of reverse curvature, preferably formed by two reversely arranged loops.

Adjacent the free end there is a bearing, and resting on this bearing and also on the free end is a spacer which is proportioned to tension or stress the resilient portion of reverse curvature. This portion is so arranged and tensioned that it moves the thermostat between its controlling positions with a snap action.

For a more complete understanding of this invention, reference should be had to the accompanying drawings in which Fig. 1 is a vertical central sectional view of an electric flatiron provided with a temperature control device embodying this invention; Fig. 2 is a plan view of the flatiron of Fig. 1 with the cover removed so as to illustrate certain details of construction; Fig. 3 is a bottom plan view of the temperature control device used in the electric iron of Figs. 1 and 2; Fig. 4 is a plan view of a temperature control device of modified form arranged in accordance with this invention; Fig. 5 is an elevation of the control device of Fig. 4; Fig. 6 is a bottom plan view of the temperature control device of Figs. 4 and 5; Fig. 7 is a vertical sectional view of an electric flatiron provided with a temperature control device of still another modified form of this invention; Fig. 8 is a plan view of the iron shown in Fig. 7 with the cover removed so as to illustrate certain structural details; Fig. 9 is a bottom plan view of the temperature control device used in the iron of Figs. 7 and 8; Fig. 10 illustrates a control or adjusting member used in the irons of Figs. 1 and 2, and also in Figs. 7 and 8, together with a temperature scale provided to assist in adjusting the temperature setting of the control device; and Fig. 11 illustrates a bimetallic thermostat arranged in accordance with this invention, but showing the thermostat before it is assembled with the thermostat organization.

Referring to the drawings, this invention has been shown as applied to electric flatirons. It is to be understood, however, that the thermostat has general application. Thus, it may be used to control waffle irons, grease kettles, percolators, etc.

Referring more particularly to Figs. 1, 2 and 3, the electric flatiron comprises a body member or sole plate 10 made of a suitable heat conducting material, such as aluminum alloy or cast iron, within which is cast a suitable electric heating unit 11. The upper portion of the body member 10 is enclosed by a cover member 12, which is secured to the body member in any suitable manner, as by means of screw fastening means (not shown). The body member is provided with a handle structure 13, which in Fig. 1 has been shown in but fragmentary fashion. The heating unit 11 may be of any suitable type, but preferably will be of the sheathed type, such as described and claimed in the United States patent to C. C. Abbott No. 1,367,341, dated February 1, 1921.

In the upper portion of the sole plate 10 is an elongated recess 14, in which is secured a temperature responsive control device for the heating unit 11. As shown, this recess 14 at its forward end is provided with a still deeper recess, or well 15 in which the temperature control device is mounted. The recess 15, as shown, extends downwardly in the sole plate to a level below the lower edge of the heating element 11. In width the recess 15 is somewhat narrower than is the width of the recess 14, as clearly shown in Fig. 2.

The temperature control device comprises a supporting plate 16, which is supported in the recess portion 14 over the recess 15. The supporting plate 16 is secured to the walls of the sole plate surrounding the recess 15, by means of screw fastening means 17.

The temperature control device further comprises a suitable thermostat, shown as a bimetallic element 18 made of two strips of metal of dissimilar temperature coefficients of expansion, such as invar and Monel metal, the two strips being securely brazed or welded together lengthwise.

The bimetallic thermostat member 18 has a portion 19 of reverse curved form, that is, it has a sinuous form, preferably having two loops 19a and 19b arranged in reverse order, as clearly shown in Fig. 3. This arrangement gives the bar 18 a distorted S-shape. The ends of the portion 19 of reverse curvature terminate in straight portions 20 and 21 which extend outwardly from the adjacent arms of the associated loops substantially at right angles thereto, and which are arranged in substantial alignment with each other, when the member 18 is assembled in the thermostat organization, as shown in Fig. 3. The loops 19a and 19b preferably will have the same length measured from the alignment of the end portions 20 and 21.

The end 21 of the thermostat 18 is rigidly secured to a support 22, which in turn is rigidly secured to the supporting plate 16. As shown, the support 22 is rigidly secured to the plate 16 by means of a rivet 23, and is provided with a portion 24 extending downwardly from the plate 16 at right angles to the main portion of the support 22. The end portion 21 of the thermostat is rigidly secured to the portion 24 by means of a screw 25. The support 22 is provided with an upright ear 26 which extends upwardly through an aperture provided for it in the supporting plate 16, as shown in Figs. 1 and 2, and which is arranged to be connected with a suitable lead 27, as by means of screw fastening means 28. The supporting plate 22 is electrically insulated from the plate 16 by means of a suitable sheet 29 formed of some suitable electrically insulating material, such as mica.

The end 20 of the thermostat 18 is free to move in response to changes in temperature, and the movement of this end is utilized to operate a suitable electric switch. This switch comprises a contact 30 carried by the free end 20 and a contact 31 which cooperates with the contact 30. The contact 31 is carried by a contact plate 32 which is rigidly secured to the plate 16 as by means of a rivet 32a. The contact plate 32 is provided with an upright ear 33 that is projected through an aperture provided for it in plate 16, and is arranged to be connected with a lead 34 as by means of a screw 35. The contact plate 32 is insulated from the supporting plate 16 by means of the mica insulating strip 29. A sheet of mica 35a, similar to the mica sheet 29, is placed on top of the plate 16 to insulate the rivets 23 and 32a from the plate 16. The mica sheets 29 and 35a also insulate the upright ears 26 and 33 from the supporting plate.

Positioned adjacent and substantially opposite the free end 20 of the thermostat is a bearing 36. Interposed between the bearing 36 and the free end 20 is a rigid spacer member 37 formed of a suitable electrically insulating material, such as porcelain. The spacer member 37, as shown more clearly in Figs. 1 and 3, is provided in its ends with bearing seats, one of which rests on the bearing 36, while the other rests on the free end of the thermostat. The bearing 36 is so positioned, and the spacer member 37 is so proportioned that when it is inserted between the bearing 36 and the free end of the thermostat, it places the portion 19 of reverse curvature under compression, that is, tensions it so that the free end normally applies a predetermined force or end thrust to the spacer member 37, and also forces the contacts 30 and 31 together. This latter force is increased by virtue of the initial form that is given the bimetallic thermostat 18. Thus, when the bimetallic thermostat is not assembled, it has a somewhat different form than when assembled with the organization of parts that make up the temperature control device shown in Fig. 3. The form that the thermostat has initially, or when it is unrestrained, is shown in Fig. 11. As there shown, the straight portion 20 at the movable end of the bar is not in substantial alignment with the straight fixed portion 21, but is supported in a position above and at an appreciable angle to a straight line containing the portion 21; and moreover, the loops 19a and 19b are "open", that is, are not compressed as they are in the assembly. When the member 18 is assembled the loops are compressed and the portion 20 brought into substantial alignment with straight portion 21. This causes the contacts 30 and 31 to be urged together with a considerable force in addition to the force urging the contacts together due to the arrangement of the spacer 37.

The bearing 36 is carried by an arm 38, which, as shown (Fig. 1) is provided with a substantially upright portion 39 that carries the bearing 36, and a portion 40 arranged at right angles to the portion 39 and which extends over the supporting plate 16. The portion 40 is pivotally secured to the supporting plate by means of a rivet 41. Carried on the end of the portion 40 is an arcuate shaped gear rack 42. Meshing with this gear rack is a gear 43 that is mounted upon a shaft 44. The shaft 44 is mounted in a support 45 which in turn is rigidly secured to the supporting plate 16 by means of ears or tabs 46 provided on the support 45 and passed through apertures provided for them in the supporting plate 16, the tabs being turned or clinched on the supporting plate 16, as shown in Fig. 3. The shaft 44 protrudes through an aperture provided for it in the casing 12 to the exterior of the iron, where an adjusting knob 48 is secured to the protruding portion of the shaft.

The support 45 carries a stop member 49 with which a stop washer 50 mounted on the shaft 44 cooperates. The stop washer 50 is provided with a stop portion 51, whose opposite ends cooperate with the stop 49 to limit the adjusting motion that can be imparted to the shaft 44. A compression spring 51a surrounds the shaft 44 and holds the stop washer 50 in place against the under surface of the support 45. The lower end of the spring rests on an abutment secured to the shaft 44.

The thermostat 18 moves between a pair of controlling positions, one of which is defined by the fixed switch contact 31, and the other of which is defined by means of a stop 52 mounted on the supporting plate 22 for the thermostat.

It will be understood that the leads 27 and 34 connected respectively with the upright ears 26 and 33 will be connected in the heating circuit of the iron so that when the thermostat is in the closed position, as shown in Fig. 3, the heating circuit for the unit 11 will be closed, whereby the unit will be energized to apply heat to the sole plate 10, and that when the thermostat is open, or moves to its controlling position against the stop 52, the heating circuit will be opened whereby the unit 11 will not apply heat to the sole plate. As shown, the iron is provided with the usual twin pin electrical supply terminals 53 and 54, which are arranged to receive the usual supply plug of twin supply conductors. The terminal 53 is electrically connected to one of the terminals 55 of the heating unit 11, while the other pin 54 is electrically connected to the lead 27.

The other lead 34 is electrically connected with the other terminal 56 of the heating unit. It will be observed that in view of these connections, when the thermostat is open, the heating unit will be de-energized, whereas when it is closed this unit will be energized.

In the operation of the thermostat, it will be understood that when the temperature of the thermal element 18 is below a predetermined temperature, it will be in its controlling position to close the switch. If when the thermostat is in this position, the iron be "plugged-in" to an electrical supply source, the heating unit 11 will be energized through the thermostat to supply heat to the sole plate 10. By continued application of heat to the sole plate the temperature of the plate will increase, and as the temperature of the plate increases, the thermal element 18 will tend more and more to move from its position shown in Fig. 3 to its open position wherein the free end 20 rests against the stop 52. This tendency of the thermostat to move, however, is opposed by the resilient force holding the movable contact 30 against the stationary contact 31 applied by the spring portion 19 defined by the reversely arranged loops 19a and 19b. Eventually, however, the plate 10 will attain a predetermined maximum temperature at which the tendency of the thermostat to move downwardly, as viewed in Fig. 3, will overcome the resisting force applied to it by the curvature 19, whereupon the thermostat will begin to move from its closed position. The spring portion 19 will oppose this movement with a decreasing force until the free end 20 of the blade 18 moves to and through a critical position, whereupon it will assist movement of the thermostat to the open switch position beyond the critical position with a force which rapidly increases. The critical position of the thermostat lies substantially in an imaginary straight line directed between the end of the thermostat carrying the contact 30 and the point of support of the fixed end 21 of the thermostat. This line joins the movable end of the thermostat with that portion of the thermostat where the straight end portion 21 joins the adjacent loop 19b.

The spring portion 19 will tend to hold the thermostat in its open position, and the thermostat will remain in this open position until the temperature of the sole plate 10 cools to a predetermined minimum at which the thermostat will overcome the resilient force applied to it by the spring 19 and will move toward its critical position, the spring 19 resisting its movement to this position with a decreasing force. When the thermostat moves through the critical position, the spring 19 assists it in closing the switch. In this manner, the thermostat maintains a predetermined temperature which is a mean between the maximum temperature at which the switch is opened and the minimum temperature at which the switch is closed.

It is to be noted that the change in overall length between the fixed and movable ends of the thermostat, as it moves to open and close the switch, is extremely small, and because of this, the end thrust pressure of the thermostat on the spacer 37 remains substantially constant. This end thrust pressure, however, can be varied somewhat during the heating and cooling cycle, by making the loops 19a and 19b of unequal length.

The temperature adjustment of the thermostat is effected by shifting the relative position of the support 24 of the fixed end of the thermostat and the bearing 36 for the spacer 37. This is accomplished by adjusting the knob 48. To increase the temperature setting, the knob is adjusted to move the bearing 36 in a counterclockwise direction, as viewed in Fig. 3. A reverse adjustment reduces the temperature setting. In order to assist the operator in adjusting the setting of the iron, a suitable temperature indicating plate 58 (Figs. 1 and 10) is attached to the upper surface of the cover 12. The plate 58, as shown, is provided with temperature indications "High" and "Low", together with temperature graduations between these indications.

In the form of the invention shown in Figs. 4, 5 and 6, the support for the fixed end of the thermostat is shiftable to adjust the temperature setting of the control device, rather than the bearing adjacent the free end of the thermostat. As shown in this form, a supporting plate 60 is provided which is arranged to be attached to the device to be heated. Mounted beneath this plate 60 is a thermostat 61 similar to the thermostat 18 of the first form described. One end 62 of this thermostat is rigidly secured to a supporting member 63, which is provided with a depending portion 64 to which the end 62 is rigidly secured. The opposite or free end 65 of the thermostat bears on a spacer member 66 which in turn rests upon a fixed bearing member 67. The bearing member 67 is rigidly secured to a depending portion 68 of the supporting plate 60, as clearly shown in Fig. 5. The member 61 is insulated from the member 64 in any suitable manner, as by means of mica washers (not shown).

Mounted in the plate 60 is a disc 70 which carries a crank pin 71 eccentrically to the axis of the disc. The crank pin 71 is received in a forked end 72 of the arm support 63 so that when the disc 70 is rotated, the arm 63 is rotated, which operation shifts the position of the fixed end 62 of the thermostat relative to the bearing 67. The disc 70 is supported on, and is operated by an adjusting stud or shaft 73 which is mounted in a bracket 74 attached to the upper surface of the plate 60. This shaft is provided with a suitable stop member 75 that engages the stop 76, these members being arranged as are the corresponding elements of Figs. 1 and 2.

The movable end 65 of the thermostat carries a contact 77 which cooperates with a fixed contact 78 carried by a contact arm 79. This contact switch arrangement is similar to that shown in the first form. A stop 80 is provided to limit the open position of the switch. This stop is mounted on a stop plate 81 which is similar in construction to the switch contact arm 79. Suitable sheets of insulating material, such as mica sheets 82 and 83, are positioned on opposite sides of supporting plate 60. These sheets as well as the contact arm 79 and the stop plate 81 are riveted to plate 60.

With the exception of the temperature adjustment this form operates as does the first form.

In the form shown in Figs. 7, 8 and 9, the temperature control device is somewhat larger than in its previous forms, but is similar in construction to that shown in the first form described in Figs. 1, 2 and 3. The sole plate 84 of the iron in this case is provided with a larger recess 85 to accommodate the thermostat. The thermostat, in this case, comprises a supporting plate 86 beneath which is mounted a thermostat 87 similar to the first forms described. The end 88 of this thermostat is rigidly secured to a support 89 which also functions as a terminal for the thermostat. This support 89 is carried by plate 86. The free end 90 of the thermostat bears on a spacer member 91 which in turn rests on a bearing 92. The free end of the thermostat carries a switch contact 93 which contacts with a stationary contact 94. The latter contact is carried by a contact strip 95 which is mounted on the plate 86.

The bearing 92 is mounted on a sector-shaped plate 96, which in turn is secured to a second sector-shaped plate 97. These plates are pivotally mounted to rotate on a pin 98 which in turn is supported on the plate 86. The plate 96 may be adjusted relative to the plate 97, and for this purpose is secured to the plate 97 by means of a screw and slot connection 99. Normally, however, these plates are moved as a rigid unit. The plate 97 on its outer edge is provided with a rack 100 with which a gear 101 mounted upon an adjusting shaft 102 meshes. The adjusting shaft 102 is provided with an adjusting knob 103 on the exterior of the iron. The contact strips 89 and 95 are electrically insulated from the plate 86 by means of a sheet of mica 104. A similar sheet 105 is positioned above the plate to insulate the supporting rivets 106 provided for the contact strips and the mica sheets. This thermostat operates in substantially the same fashion as the form described in Figs. 1, 2 and 3, in that temperature adjustment is effected in the same manner by adjusting the knob 103 which shifts the fixed bearing 92 relative to the fixed end 88 of the thermostat.

It will be observed that the plate 86, as in the previous forms, supports the complete mechanism of the thermostat in thermal relation with the iron.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device comprising a bimetallic temperature responsive element having one end free to move in response to temperature changes, the major portion of the length of said element being provided with a pair of reversely arranged loops of substantially the same length so that when said element is subjected to temperature changes one of said loops contracts and the other expands in substantially equal amounts to maintain a substantially constant overall length between the ends of said element and so that said free end moves substantially in the arc of a circle, a pivoted rigid member bearing on said free end and moving with it in its plane of movement as said free end moves, and a control element operated by the movement of said free end.

2. A temperature control device comprising an elongated bimetallic temperature responsive element having two relatively short straight end portions in substantial alignment, one of said end portions being free to move responsively to temperature changes, and the major portion of the length of the element between its ends being formed into reversely arranged loops having predetermined lengths relatively to each other on opposite sides of a line directed substantially through said straight ends, a bearing opposite said free end, and a rigid member having one end resting on said bearing and its other end on said free end of said element to compress said loops, said loops thereby functioning to cause said element to snap between controlling positions, and as the temperature changes, one of said loops contracting while the other expands by amounts depending upon their lengths so that the end pressure of said element on said bearing is controlled within predetermined limits as said element moves between said controlling positions.

3. A temperature control device comprising an elongated bimetallic thermostat bar having a pair of reversely arranged loops and end portions projecting from said loops in substantial alignment with each other, a support for one of said end portions, a bearing seat adjacent the other of said end portions, a rigid spacer bar resting on said other end portion and also on said bearing seat arranged to tension said portion of reverse curvature, whereby said portion moves said bar with a snap action between controlling positions, the lengths of said loops being substantially equal measured from the alignment of said end portions so that when said temperature varies one contracts by an amount substantially equal to the expansion of the other, thereby to maintain the pressure on said spacer bar substantially constant as said thermostat bar moves between said controlling positions and means for changing the relative positions of said support and said bearing seat so as to vary the temperature setting of said control device.

4. A temperature control device comprising a resilient bimetallic thermostat having a portion of reverse curvature formed of reversely arranged loops of substantially the same length and having end portions projecting therefrom in substantial alignment with said other, means supporting one of said end portions, a bearing seat adjacent the other of said end portions, a rigid spacer bar resting on said other end portion and also on said bearing seat arranged to tension said portion of reverse curvature, and means for changing the position of said bearing seat so as to change the temperature setting of said device.

5. A temperature control device comprising a support, bimetallic thermostat having a pair of reversely formed loops with their two ends projecting in substantial alignment from the loops and said loops having substantially equal lengths measured from the line of said ends, means rigidly securing one of said ends to said support, a bearing opposite the other of said ends, a spacer bar having one end resting on said bearing and its other end resting on said other end of said thermostat, an arm carrying said bearing pivotally mounted on said support, a gear segment carried by said arm, a shaft, a gear on said shaft meshing with said gear segment, and means for adjusting said shaft to vary the position of said bearing.

6. A temperature control device comprising a support, a bimetallic thermostat having a pair of reversely formed loops with their two ends projecting in substantial alignment from the loops, an arm pivotally mounted on said support, means rigidly securing one end of said thermostat to said arm, a bearing opposite the other end of said thermostat, a spacer bar having one end resting on said bearing and its other end resting on said other end of said thermostat, an eccentric mounted on said support cooperating with said arm so that when rotated the angular position of said arm is varied, and means for adjusting the position of said eccentric.

7. A temperature control device comprising a support, a fixed switch contact carried by said support, a bimetallic thermostat having reversely arranged loops defining a portion of reverse curvature, and also having a pair of substantially straight portions at the ends projecting from said loops respectively, said straight portions being substantially out of alignment and said loops being open when said thermostat is free, a contact carried by one of said straight portions, a movable bearing member for said one straight portion mounted on said support and means for rigidly securing said other straight portion to said support so that when said one straight portion is mounted in its bearing, said straight portions are in substantial alignment, said loops are compressed and of substantially equal lengths, and said contacts are closed at room temperature.

8. A temperature control device comprising an elongated bimetallic temperature responsive element having two straight ends in substantial alignment, one of the ends being free to move responsively to temperature changes, and the major portion of the length of said element between its two ends being formed into a single pair of reversely arranged loops having predetermined lengths relative to each other measured from a line passing substantially through said straight ends, a bearing opposite said free end, and a rigid member having one end resting on said bearing and its other end on said free end to tension said loops, said loops thereby functioning to cause said element to snap between controlling positions, and as the temperature changes one of said loops contracting while the other expands by amounts depending upon their respective lengths so that the end pressure of said element on said bearing is controlled within predetermined limits as said element moves between controlling positions.

9. A temperature control device comprising a support, a fixed switch contact carried by said support, a bimetallic thermostat having reversely arranged loops defining a portion of reverse curvature, and also having a pair of substantially straight portions at the ends projecting from said loops respectively, said straight portions being substantially out of alignment and said loops being open when said thermostat is free, a bearing member for one of said straight portions mounted on said support and means for securing the other of said straight portions to said support so that when said one straight portion is mounted in its bearing, said straight portions are in substantial alignment and said loops are compressed.

ROBERT L. UHL.